United States Patent [19]
Shiratori

[11] Patent Number: 5,061,091
[45] Date of Patent: Oct. 29, 1991

[54] BEARING CASE
[75] Inventor: Koji Shiratori, Shizuoka, Japan
[73] Assignee: Shiratori Co., Ltd., Japan
[21] Appl. No.: 607,272
[22] Filed: Oct. 31, 1990
[51] Int. Cl.$^5$ .......................................... F16C 35/067
[52] U.S. Cl. .................................................. 384/539
[58] Field of Search ............... 384/539, 537, 584, 585, 384/488

[56] References Cited
U.S. PATENT DOCUMENTS
1,803,591  5/1931  Bott ...................................... 384/539
3,999,815  12/1976  Dauwalder ........................ 384/584
4,793,459  12/1988  Forknall et al. ................... 384/539
5,002,407  3/1991  Chi ..................................... 384/539

Primary Examiner—Lenard A. Footland

[57] ABSTRACT

A bearing case for a roller slide comprises a casing, an arm, a stopper formed on the casing and a pawl retainer formed around the outer edge of an end of the arm, which are all formed of a tough material by integral molding. The casing for receiving a bearing comprises a drum, an inner lid and an outer lid and has a depth virtually equal to the thickness of the bearing and an inner diameter virtually equal to the outer diameter of the bearing, and the arm has an outer diameter virtually equal to the diameter of a hole in which the bearing is built.

5 Claims, 2 Drawing Sheets

BEARING CASE

BACKGROUND OF THE INVENTION

1. Field of the Invention

The present invention relates to a case for attaching a bearing to a side plate of a roller slide, a side frame of a roller conveyor, etc. More particularly, it is directed to a bearing case to be fitted into a hole for the attachment of a rotary shaft.

2. Prior Art

A rotary shaft of a roller slide or conveyor is supported by a ball or a roller bearing attached to its side plate or frame.

Usually, a bearing such as a ball or roller bearing is built in a housing formed of a tough material such as cast iron fixed to a side plate or the like by means of bolts.

To this end, however, at least two bolt holes, through which the housing is bolted, have to be provided in each side plate or frame in addition to a hole for the attachment of a rotary shaft. This poses a problem of requiring much labor and time.

In particular, a bearing built in installations located outdoors such as a roller slide has a short service life, partly because it is exposed to wind and rain over an extended period of time and partly because it takes up much sand grains, etc. A considerable difficulty is also encountered in fixing such bearing, because the fixture must be carried out at a construction site.

Having been accomplished with the foregoing in mind, the present invention seeks to provide a bearing case which enables a bearing to be easily attached to a side plate of a roller slide or a side frame of a roller conveyor and has an increased service life outdoors.

SUMMARY OF THE INVENTION

According to the present invention, this object is achieved by providing a bearing case comprising a casing, an arm, a stopper formed on the casing and a pawl retainer formed around the outer edge of an end of the arm, all said parts being formed of a material having suitable elasticity such as nylon or polyethylene, wherein:

said casing has a depth virtually equal to the thickness of the bearing and an inner diameter virtually equal to the outer diameter of the bearing, and said arm has an outer diameter virtually equal to the diameter of a hole in which the bearing is built.

In accordance with this arrangement, when the bearing case is inserted into an associated hole, it yields in an inward direction by an amount corresponding to the height of the pawl retainer and regains its original form simultaneously with the pawl retainer passing by the inner end edge of the hole.

The bearing case according to this invention, in which a bearing has already been built in, can be easily inserted into an associated hole at a site where a roller slide is constructed.

In addition, the bearing housed in the casing is neither exposed to wind nor rain and is not likely to take up sand grains, etc. and so can be kept in good condition over an extended period of time.

BRIEF DESCRIPTION OF THE DRAWINGS

The present invention will now be explained specifically but not exclusively with reference to the accompanying drawings, in which.

DETAILED EXPLANATION OF THE INVENTION

The bearing case according to this invention will now be explained more illustratively with reference to an embodiment in which it is applied to a roller slide.

Figure 1:
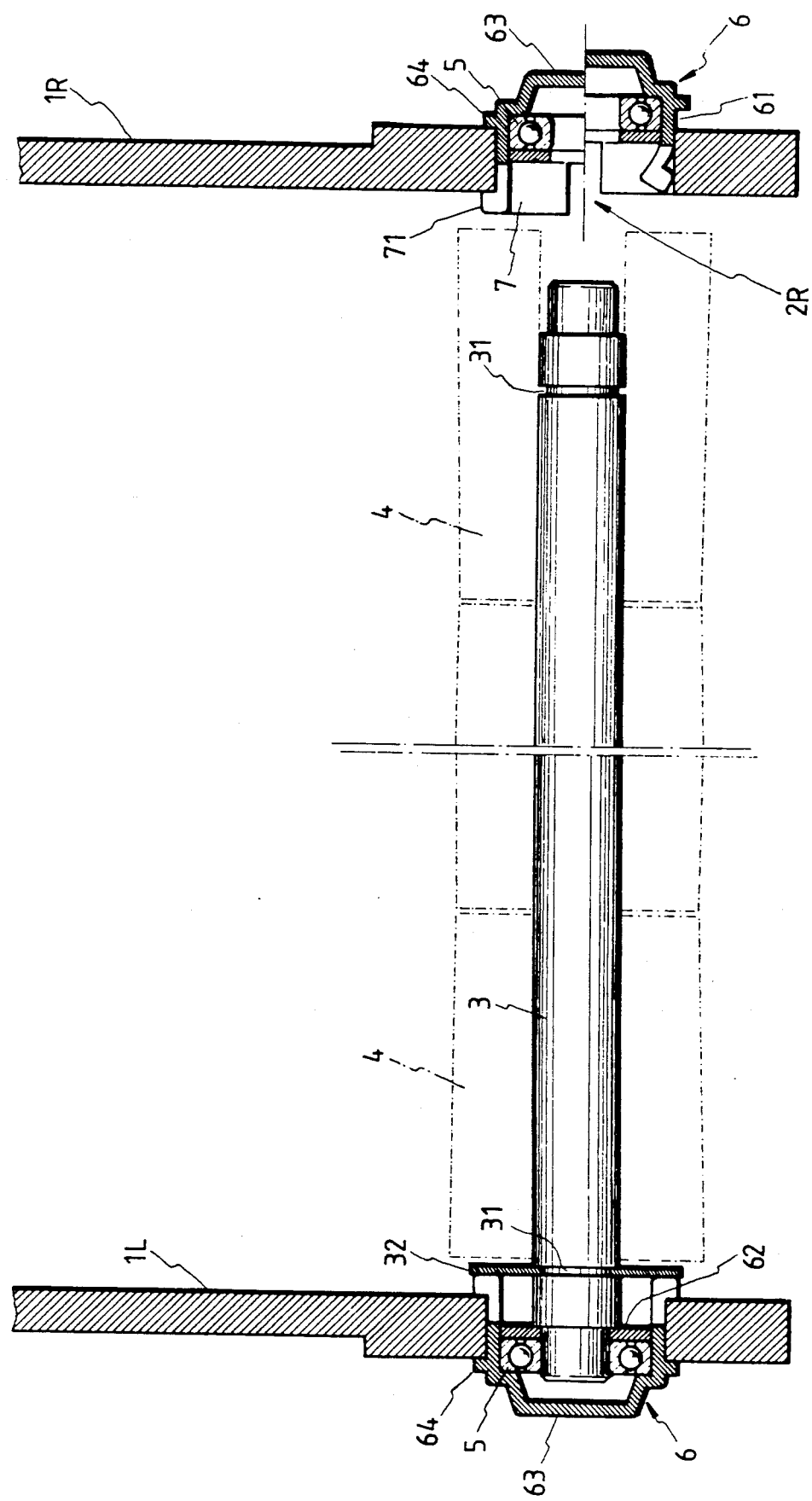
FIG. 1 is a longitudinally sectioned view showing one embodiment of the bearing case with a bearing built in it, which is attached to a roller slide.

FIG. 1 is a longitudinally sectioned view showing one example of the sliding lane of the roller slide. Each of side plates 1 is provided with a number of holes 2 at regular intervals. Reference numeral 3 stands for a rotary shaft and 4 a roller element. A bearing 5, housed in a bearing case, is placed in each hole 2.

Defining both sides of the sliding lane, a pair of side plates 1 are designed to serve as frames for the attachment of roller elements 4 and means for ensuring the safety of those at play. Each plate 1 is formed of a tough material such as an iron pipe or aluminium extrudate.

The hole 2 is a through-hole for the attachment of a rotary shaft 3, and is oppositely provided near a lower end portion of each plate 1 at an interval slightly larger than outer diameter of roller elements 4.

Supporting a plurality of roller elements 4 between both side plates 1, the rotary shaft 3 has a surface so smoothed that the roller elements 4 can rotate smoothly.

Each roller element 4 is supported on the rotary shaft 3 between both side plates 1 to define a part of a sliding lane, and is formed of a material having high weather resistance and low frictional resistance such as nylon. The roller element 4 is loosely fitted onto the rotary shaft 3 for free rotation.

Comprising a casing 6 having a drum 61, an inner lid 62 and a side 63 and an arm 7 having a pawl retainer 71 at an outer edge of its end, a bearing case is formed of a material having suitable weather resistance and elasticity such as nylon or polyethylene by integral molding.

Receiving a bearing 5, the casing 6 has a depth virtually equal to the thickness of the bearing 5 and an inner diameter virtually equal to the outer diameter of the bearing 5, so that it can be in tight engagement with the bearing 5.

Figure 2:
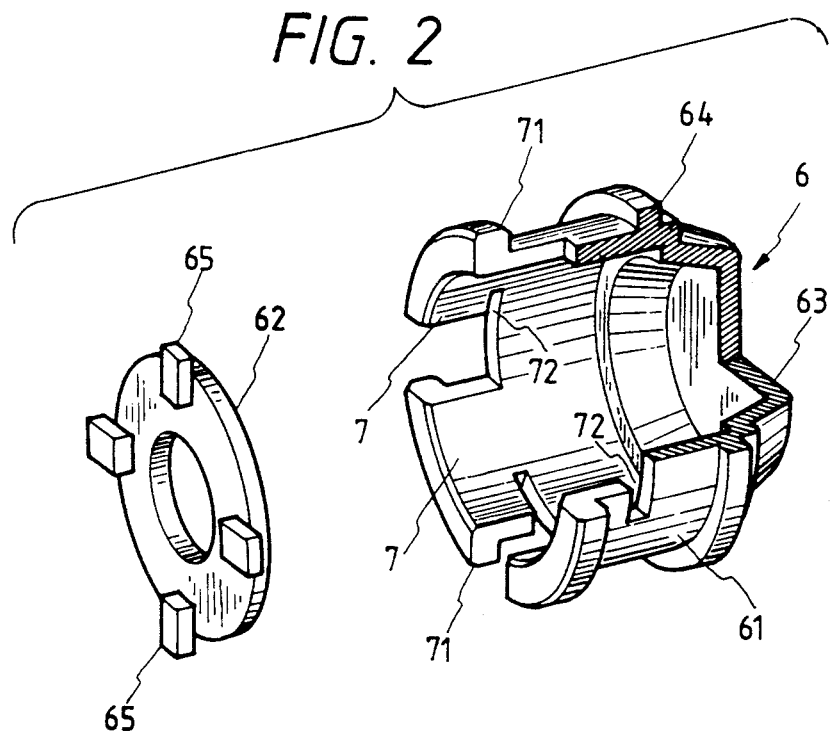
FIG. 2 is a partly cut-away perspective view of that embodiment.
Figure 3:
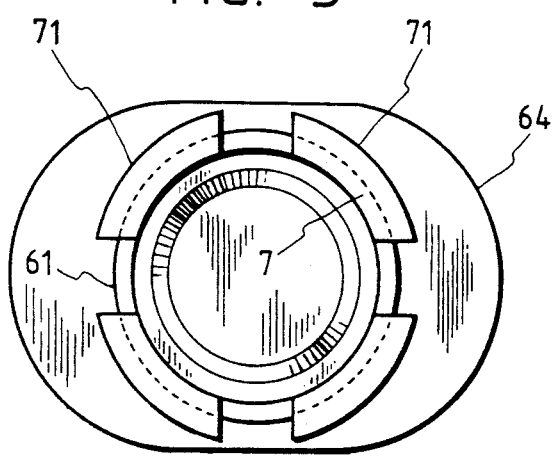
FIG. 3 is a front view of another embodiment of the bearing case according to this invention.

According to the embodiment illustrated in FIGS. 1-3, the bearing case is designed to stand up to an increased load, while the casing 6 with the bearing 5 housed in it is fitted into the hole 2. To this end, the hole 2 is of a diameter larger than the outer diameter of the bearing 5 by a few millimeters, and the drum 61 has an outer diameter virtually equal to the diameter of the hole 2 so that it can be tightly fitted into the hole 2.

The casing 6 includes around the outer edge of the base end portion a stopper 64 which is to fix the bearing case at a given position in the hole 2. It is noted that the inner lid 62 is provided separately from the casing 6.

The casing 6 may have an outer diameter slightly larger than the diameter of the hole 2 or an inner diameter slightly smaller than the outer diameter of the bearing 5 in order to be press-fitted between the hole 2 and the bearing 5.

The casing 6 may also be provided in its inner face with an undercut for more firmly retaining the bearing 5.

The stopper 64 is provided to fix the bearing case at a predetermined position in the hole 2, while the pawl retainer 71 is provided to prevent the bearing case, once inserted into the hole 2, from being disengaged from within the hole 2. Both parts, positioned at an interval virtually equal to the width of the hole 2 (or the thickness of the side plate 1), cooperate with each other in retaining and fixing the bearing case at a predetermined position in the hole 2.

The arm 7 is provided to prevent the bearing case, once fitted in the hole 2, from being disengaged from within the hole 2. Having an outer diameter virtually equal to the diameter of the hole 2, the arm 7 is designed such that when the bearing case is inserted into the hole 2, it yields in an inward direction through its elasticity by an amount corresponding to an amount of the height of the pawl retainer 71. Simultaneously with the pawl retainer 71 passing by the inner end edge of the hole 2, the arm 7 regains its original form, making the pawl retainer 71 engage within the hole 2.

The inner lid 62, which is in the form of a doughnut whose outer diameter is virtually equal to the inner diameter of the casing 6, is to be clamped on the casing 6 after receiving the bearing 5.

Having an outer diameter slightly larger than the inner diameter of the casing 6, the inner lid 62 may be press-fitted into the hole 2. Alternatively, the inner lid 62 may be provided with two or more projections 65, and the arm 7 may be provided with grooves 72 as many as the projections 65. After the inner lid 62 has been fitted into the casing 6, it is turned to engage the projections 65 within the associated grooves 72 for tighter fixation.

It is understood that, as shown in this embodiment, the side 63 of the casing 6 bulges out to define a space in it, which is to be filled with grease.

In what follows, how to attach the bearing 5 to the side plate 1 or, to put it another way, how to attach the rotary shaft 3 to the side plate to form a part of the sliding lane of the roller slider will be explained.

First, the bearing 5 is incorporated in the casing 6 of the bearing case, and the inner lid 62 is press-fitted into the casing 6, followed by filling the predetermined amount of grease in the casing 6.

Then, the arm 7 is inserted into the hole $2_R$ in the right side plate $1_R$, whereupon it advances in the hole 2R, while yielding in an inward direction by an amount corresponding to the amount of height of the pawl retainer 71, and eventually regains its original form just upon the pawl retainer 71 passing through the hole $2_R$. At the same time when the pawl retainer 71 is engaged within the hole $2_R$ in this manner, the stopper 64 reaches the outer face of the side plate $1_R$, where the bearing case stops, so that the bearing case can be fixed in the hole $2_R$.

Afterwards, the rotary shaft 3 is inserted from a hole in the left side plate $1_L$ through the roller elements 4 until it is inserted at its end into the bearing 5 built in the right side plate $1_R$.

Finally, another bearing case comprising the casing 6 with the bearing 5 built in it is fitted in the hole in the left side plate $1_L$ in the same manner as mentioned above.

Thus, it is possible to build the bearing 5 in the hole $2_R$ in the right side plate $1_R$ before a roller slide is constructed at a construction site.

When it is likely that the bearing case may be disengaged from within the hole 2 by reason of the side plate 1 being formed of a soft material such as a wooden sheeting or by force tending to displace the rotary shaft in a lateral direction during use, the stopper 64 may be provided with a portion partially enlarged to be bolted onto the side plate, as illustrated in FIG. 3.

Also, the rotary shaft 3 may be provided with a groove 31, as shown in FIG. 1. After the shaft 3 has been inserted into the hole 2, an E-ring 32 is fitted into the groove 31 to prevent a lateral displacement of the shaft 3.

Figure 4:
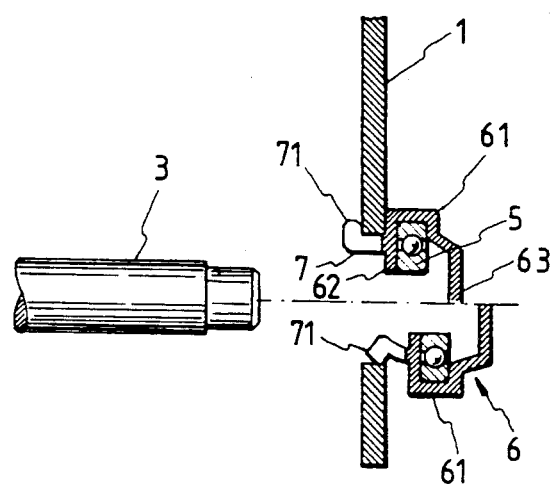
FIG. 4 is a longitudinally sectioned view of a further embodiment of the bearing case according to this invention, which is attached to a side plate.

FIG. 4 illustrates another embodiment of the bearing case according to this invention, wherein a casing 6 is positioned on the outside of a hole 2 to mount the bearing case on a thin side plate, etc. The outer diameter of an arm 7 is larger than the inner diameter of the bearing 5 by a few millimeters, so that there can be a dimensional difference between the outer diameter of the arm 7 and the outer diameter of the casing 6, allowing the casing 6 itself to function as a stopper. In the instant embodiment, an inner lid 62 is made integral with the casing 6, while a side 63 is provided separately from the casing 6. After the bearing 5 has been built in the casing 6, the side 63 is attached to the casing 6.

How to attach this bearing case to the side plate 1 is the same as explained in connection with FIG. 1. First, the bearing 5 is incorporated in the casing 6 of the bearing case, and the side 63 is fitted onto the casing 6, followed by filling an amount of grease in the casing 6.

Then, the arm 7 is inserted into the hole 2 in the side plate 1, whereupon it advances in the hole 2, while yielding in an inward direction by an amount corresponding to the amount of height of the pawl retainer 71, and eventually regains its original form just upon the pawl retainer 71 passing through the hole 2. At the same time when the pawl retainer 71 is engaged within the hole 2 in this manner, the casing 6 reaches the outer face of the side plate 1, where the bearing case stops, so that the bearing case can be fixed in the hole 2.

According to this invention as detailed above, the bearings are built in the holes in the side plates. Thus, the support shaft rotates so smoothly that the sliding lane can be kept in a good condition with a reduced or limited wearing of the roller units, resulting in an increase in the service life of the slide.

What is claimed is:

1. A bearing case comprising a casing, an arm, a stopper formed on the casing and a pawl retainer formed around the outer edge of an end of the arm, wherein:
    said casing for receiving a bearing comprises a drum, an inner lid and an outer lid and has an inner diameter virtually equal to the outer diameter of the bearing, and
    said arm has an outer diameter virtually equal to the diameter of a hole in which the bearing is built.

2. A bearing case as claimed in claim 1, wherein the side of said casing bulges out to define a space in it, which is to be filled with grease.

3. A bearing case as claimed in claim 1, wherein said stopper is provided with a portion partially enlarged to be bolted onto a side plate to which said bearing case is attached.

4. A bearing case as claimed in claim 1, wherein a rotary shaft is provided with a groove, in which an E-ring is fitted to prevent a lateral displacement of said rotary shaft.

5. A bearing case as claimed in claim 1, wherein said inner lid is provided with two or more projections while said arm is provided in the side with grooves as many as said projections, whereby said projections are fitted into said grooves after the fitting of said inner lid into said casing.

* * * * *